United States Patent [19]
Pozzi

[11] 3,818,960
[45] June 25, 1974

[54] MANUFACTURE OF DOOR JAMB AND DOOR STOP SIMULTANEOUSLY FROM SAME WOOD MEMBER

[75] Inventor: Arthur A. Pozzi, Portland, Oreg.

[73] Assignee: Bend Millwork Company, Bend, Oreg.

[22] Filed: Oct. 10, 1972

[21] Appl. No.: 296,249

[52] U.S. Cl.............. 144/326 R, 144/3 R, 144/41, 144/134 R
[51] Int. Cl. ............................................ B27c 9/00
[58] Field of Search............ 144/41, 3 R, 134, 323, 144/321, 322, 326 R

[56] References Cited
UNITED STATES PATENTS
1,792,762  2/1931  Rockwell ................... 144/326 R X
2,449,605  9/1948  Reiton........................... 144/41 UX
2,635,657  4/1953  Dietrich.............................. 144/41

Primary Examiner—Andrew R. Juhasz
Assistant Examiner—W. D. Bray
Attorney, Agent, or Firm—Klarquist, Sparkman, Campbell, Leigh, Hall & Whinston

[57] ABSTRACT

A method and apparatus for simultaneously manufacturing a door jamb and door stop from the same wood member are described in which the stop is completely formed before it is separated from such wood member. Some surfaces of the stop and jamb are shaped simultaneously by the same cutter. As a result, the stop is easier to manufacture, because it is shaped while it is still attached to a thicker board so that it is easier to hold during cutting, requires less precision cutting and is not broken as often. This also enables the board to be fed through the shaper apparatus at a faster rate.

7 Claims, 13 Drawing Figures

MANUFACTURE OF DOOR JAMB AND DOOR STOP SIMULTANEOUSLY FROM SAME WOOD MEMBER

BACKGROUND OF THE INVENTION

The subject matter of the present invention relates generally to the manufacture of door jambs and door stops used to form doorways in homes, office buildings, and the like. In particular, the present invention relates to an improved method and apparatus for manufacturing the door jamb and door stop simultaneously from a single wood member, so that the stop is completely formed before it is separated from such wood member. In addition, some surfaces of both the door jamb and the door stop are shaped simultaneously by the same cutting element. As a result, the method and apparatus of the present invention enable manufacture of the door jamb and door stop faster and less expensively than prior art methods.

Previously, it has been the practice to manufacture the door jamb and door stop out of two separate pieces of wood at different times or by different shapers, which increases the manufacturing time and expense. Thus, in conventional methods, the door jamb is formed from a rectangular cross-section board of about 1⅜ inches by 3 inches from which a corner section is removed to form an L-shaped surface on the top of the jamb. Such removed section is lost as waste material. With the present invention, this waste section is now used to form the door stop and is separated from the board containing the door jamb only after the stop is completely formed. With previous methods, the door stop was formed from a separate board of much smaller size, on the order of about 7/16 inch thick by 1½ inches wide, which was then cut to a finished stop size of 11/32 inch by 1 11/32 inches. This thin wood member must be held while the door stop is shaped, and this is extremely difficult due to the narrow thickness of the piece. Furthermore, the shaping must be done with extremely precise cutting to accurately form the stop member, because there is very little tolerance for error due to its small size. In addition, as a result of its small size and the difficulties with holding and cutting, such separate jamb member is much easier broken during manufacture. As a result, the thin jamb member must be fed at a relatively slow speed of about 120 linear feet per minute through the shaper apparatus.

These problems are all overcome by the method and apparatus of manufacture of the present invention, since the door stop is formed simultaneously with the door jamb from a much larger wood member, so that it can be fed through the shaper apparatus at a faster speed of 200 to 300 feet per minute. As a result, manufacturing in accordance with the present invention takes less time and is less expensive than prior methods of manufacture. For example, using the present invention, a production of 200,000 linear feet per machine per 8 hour day has been achieved, compared with an earlier production of only 25,000 linear feet per machine per 8 hour day, using conventional manufacturing methods on the same machine, except for changes in the cutter heads.

It is, therefore, one object of the present invention to provide an improved method and apparatus for manufacturing door jambs and door stops faster and less expensively while also reducing the amount of waste wood.

Another object of the invention is to provide such manufacturing in which the door jamb and door stop are formed simultaneously from the same wood member.

Still another object of the present invention is to provide such manufacturing in which some surfaces of the stop and jamb are shaped simultaneously by the same cutter.

A further object of the invention is to provide such manufacturing in which the door jamb is completely formed before it is separated from the wood member containing the door jamb.

An additional object of the invention is to provide such manufacturing in which the door jamb is easier to hold during shaping, requires less precision cutting and is not as easily broken.

BRIEF DESCRIPTION OF THE DRAWINGS

Other objects and advantages of the present invention will be apparent from the following detailed description of a preferred embodiment thereof and from the attached drawings of which:

FIG. 4 is an enlarged vertical section view taken along the line 4—4 of FIG. 2 showing a cutter blade used to perform the method step of FIG. 1C;

DESCRIPTION OF PREFERRED EMBODIMENTS

Figure 1A:
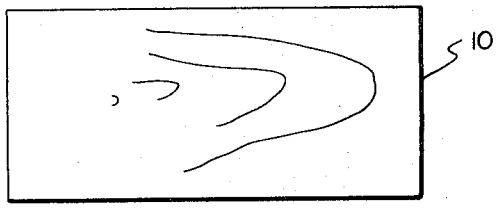
FIGS. 1A to 1H show different steps in the method of manufacture of the present invention.
Figure 1B:
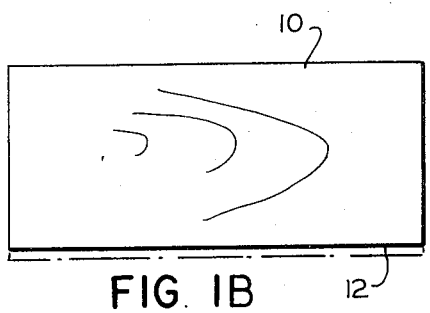

The method of simultaneously manufacturing a door jamb and a door stop from the same wood member in accordance with the present invention is shown in FIGS. 1A through 1H, illustrating different steps of the method. Thus, the method begins with a wood member or board 10 having a rectangular cross section of about 1⅜ inches by 3 inches and having a length greater than the height of the door, for example 16 feet long. Any suitable wood, such as ponderosa pine, may be employed for the stock lumber 10. As shown in FIG. 1B, the stock lumber member 10 is first shaped to form a smooth, flat bottom surface 12 by cutting it with rotating knives which provides a bottom reference surface. Next, one side of the board 10 is shaped in FIG. 1C to provide a pair of smooth, flat side surface portions 14 and 16 separated by a groove portion 18, by cutting with a single rotating knife of the type shown in FIG. 4. A plurality of these knives are attached to a rotating head in uniform spaced relationship about the head axis as hereafter described. The first side surface portion 14 forms one side of the door stop member, while the second side surface portion 16 forms one side of the door jamb member. The first groove 18 is spaced a predetermined distance from reference surface 12 and provides a saw guide groove, which enables the stop member to be separated from the wood member 10 in the sawing step of FIG. 1F, hereafter described.

Figure 1F:
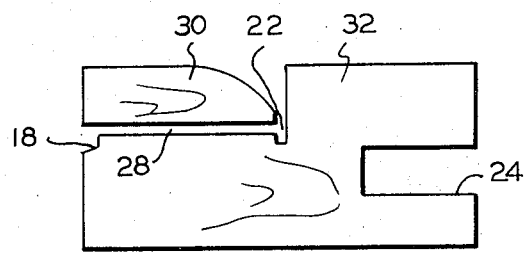
Figure 1C:
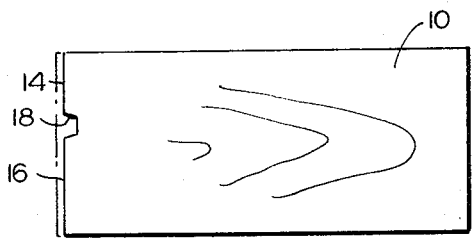
Figure 1G:
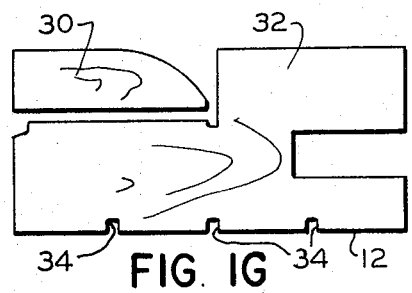
Figure 1D:
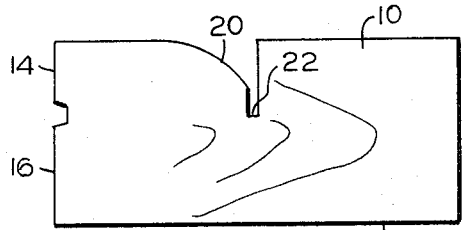
Figure 1H:
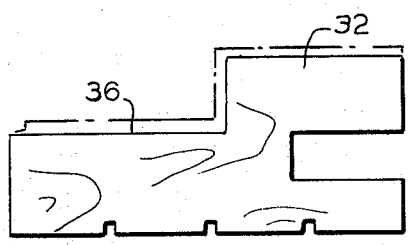
Figure 5:
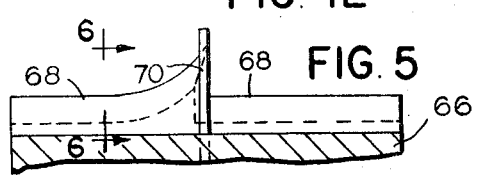
FIG. 5 is an enlarged vertical section view taken along the line 5—5 of FIG. 2 showing the two cutter blades used to perform the method step of FIG. 1D.
Figure 6:
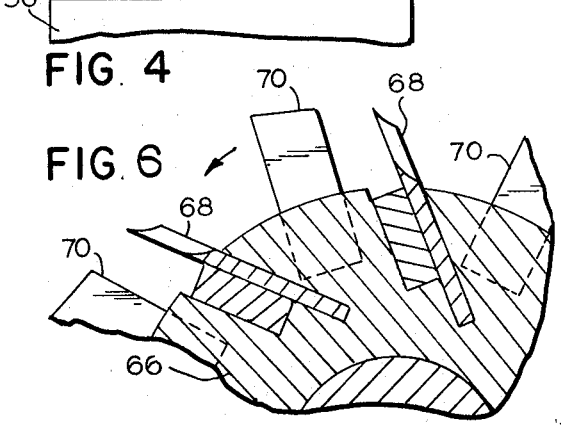
FIG. 6 is a vertical section view taken along the line 6—6 of FIG. 5 showing the spaced relationship of the two cutter blades.

As shown in FIG. 1D, the board 10 is next shaped to provide a curved upper surface 20 intersecting a second groove or vertical slot 22 which are both formed simultaneously by pairs of cutter blades on the same rotating head, shown in FIG. 5 and FIG. 6. The curved upper surface 20 forms the top of the door stop member, and is shaped before such stop member is separated from the rest of the board 10 used to form the door jamb member. It should be noted that side surfaces 14 and 16 form reference surfaces which engage guide rails to determine the horizontal position of the vertical slot 22 and the curved upper surface 20, while the bottom surface 12 forms a reference surface which engages the shaper table top to determine the vertical position of the bottom of slot 22 and curved surface 20. Thus, the bottom of the second groove 22 is spaced a predetermined distance from the reference surface 12 which is substantially the same as the spacing of the first groove 18, as shown in FIGS. 1D and 1F.

Figure 1E:
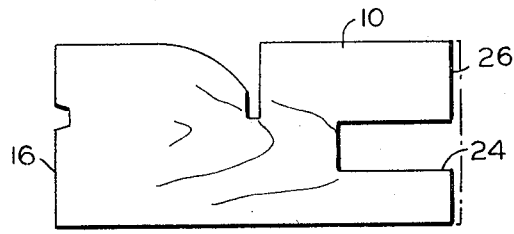

As shown in FIG. 1E, an optional rectangular notch 24 may be cut in the other side of the door jamb member opposite from side surface 16 when such other side is shaped to a smooth flat surface 26 by another set of rotating knives. However, notch 24 is only employed for "split" type door jambs.

A horizontal saw cut 28 is provided in FIG. 1F from the bottom of side groove 18 to the bottom of vertical slot 22, in order to completely finish the door stop member 30 and enable it to be separated from the door jamb member 32. However, before separation, a plurality of longitudinal grooves 34 may be formed in the bottom surface 12 of the door jamb member 32 by three spaced vertical saws, as shown in FIG. 1G. After separation a step-shaped top surface 36 is provided on the top of the door jamb member 32 by other suitable rotating knives to completely form the door jamb member. It should be noted that an optional horizontal weather stripping cut may be provided in the vertical portion of the top surface 36 of the door jamb following the step of FIG. 1H when the jamb is used on external doors.

It can be seen from the above-mentioned method steps of FIGS. 1C through 1G that both the door stop member 30 and the door jamb member 32 are simultaneously manufactured from the same board of stock lumber 10. Thus, the side surface 14 and 16 of these members are cut simultaneously by the same cutter. In addition, the door stop member 30 is completely formed before it is separated from the remainder of the board 10 containing the door jamb 32. This results in the increased speed of production and other advantages discussed above. Also, there is much less waste and a corresponding reduction in the cost of the stock material, compared with conventional methods which remove the entire upper left corner section of the board 10 from which the present stop member 30 is formed, and discharge such corner section as wood shavings waste material.

Figure 2:
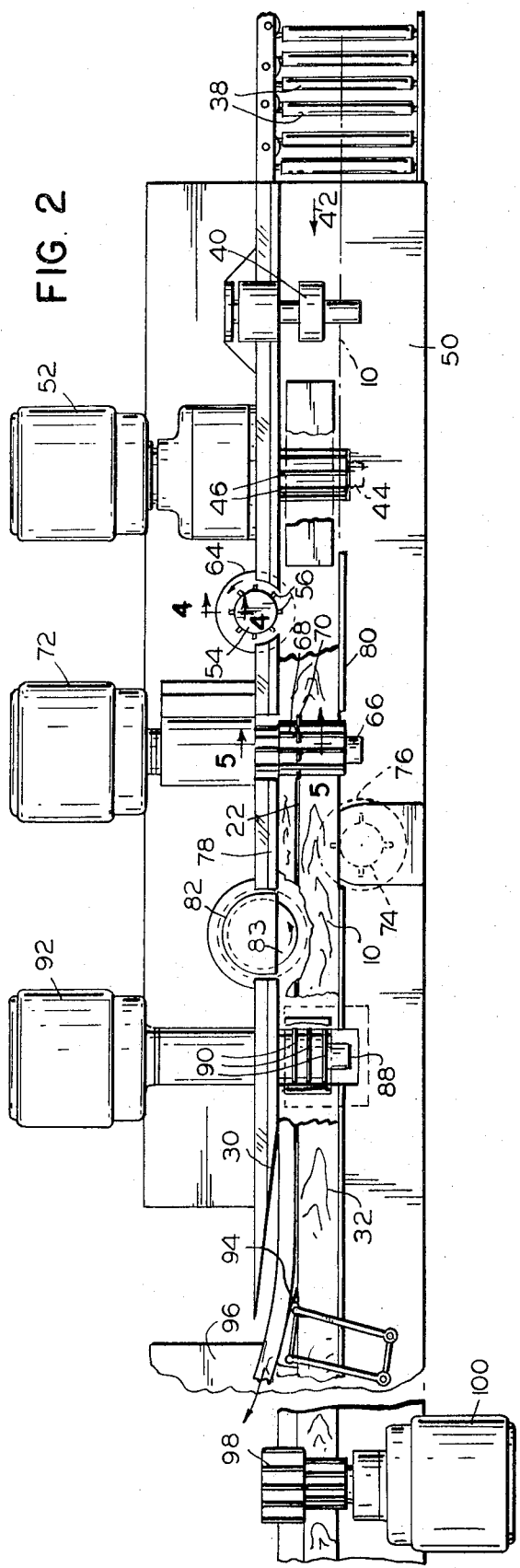
FIG. 2 is a plan view of the top of one embodiment of a manufacturing apparatus in accordance with the present invention.
Figure 3:
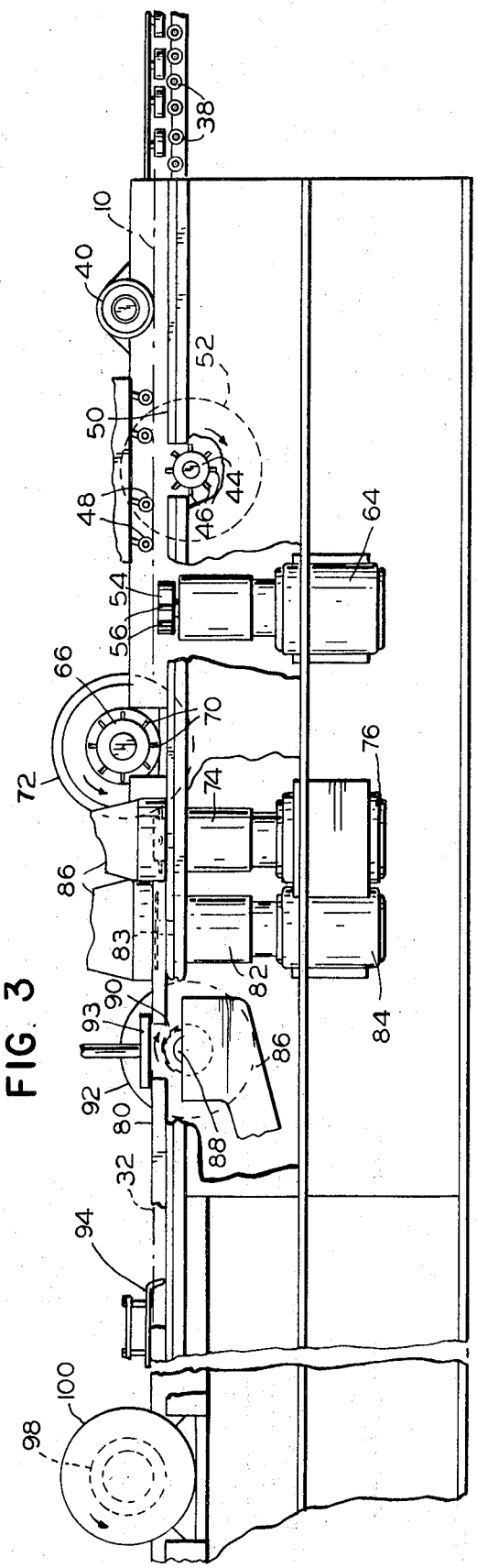
FIG. 3 is a side elevation view of the apparatus of FIG. 2.

A manufacturing apparatus in accordance with the present invention is shown in FIGS. 2 and 3 for performing the method previously described. The boards of stock lumber 10 are moved manually along conveyor rollers 38 at the input end of the machine and pass under a motor driven feeder roller 40 which feeds the boards forward in the direction of arrow 42 at a speed on the order of 200 to 300 linear feet per minute. The board 10 passes over a first rotating cutter head 44 having a plurality of transverse knife blades 46 which smooth the bottom surface 12 of the board, as shown in FIG. 1B. A pair of pressure rollers 48 are provided above the first cutter head 44 to hold the board down in contact with the upper surface 50 of the shaper table. The cutter head 44 is rotated about a horizontal axis by an electric motor 52 at a high rate of speed on the order of 6,000 rpm. Next, the board 10 is fed past a second cutter head 54 which forms the side surfaces 14 and 16 and the saw groove 18, shown in FIG. 1C. This second cutter head includes a plurality of vertical knives 56, which are shown in greater detail in FIG. 4. These knives 56 include first and second cutting edges 56 and 60 which form side surface 14 and 16 and an intermediate cutting edge projection 62 which forms the saw groove 18. Another electrical motor 64 rotates the second cutting head 54 about a vertical axis at approximately the same speed of 6,000 rpm as the first cutting head.

After leaving cutter 54, the board 10 passes a third cutter head 66 positioned over the board and provided with a plurality of pairs of knives having two different types of knife blades 68 and 70, as shown in FIGS. 5 and 6, respectively, which shape the curved upper surface 20 and the vertical slot 22 of FIG. 1D. The knife blades 70, forming the vertical slot 22 are hollow ground and positioned between successive blades 68. The pattern knives 68 and the slotting knives 70 are uniformly spaced and distributed about the cutter head 66 so that such head is balanced and can rotate at a high speed of about 6,000 rpm by another electric motor 72. A fourth cutter head 74 is positioned adjacent the opposite side of the board 10 from the second head 54 and is rotated about a vertical axis by motor 76 so that knife blades thereon form the notch 24 and the side surface 26 of FIG. 1E. It should be noted that the board is held against inward movement by a guide rail 78 extending up from the table surface on the opposite side of the board from the fourth cutter head 74. In a similar manner, another guard rail 80 is provided on the opposite side of the board from the second cutter head 54 to hold the board against outward movement during cutting by such second head.

A fifth cutter head 82 including a circular saw 83 having its blade extending horizontally and rotated about a vertical axis at about 7,200 rpm by motor 84 is positioned immediately behind the fourth cutter head 74 to provide the saw cut 28 of FIG. 1F. It should be noted that a vacuum hood 86 is positioned above the saw teeth to suck up any sawdust or wood shavings and similar vacuum type hoods are provided adjacent the other cutters. The saw 82 may have tungsten carbide tips on its blade to prevent breakage due to overheating.

Following the saw 83, a sixth cutter head 88 is provided and includes three vertical saw blades or cutters 90 which form the longitudinal grooves 34 of FIG. 1G. The three vertical saws or cutters 90 are driven by another electric motor 92 at approximately the same speed as the other cutter heads. A pressure foot 93 is positioned about the saws 90 to hold the board 10 against upward movement.

A metal wedge 94 is positioned a short distance behind a sixth cutting head 88, in order to separate the door stop member 30 from the door jamb member 32 as the board 10 is fed past such wedge. The door stop member 30 is separated along the vertical slot 22 and is fed onto a storage table 96. However, the door jamb member 32 continues on past the wedge to a seventh cutter head 98, driven by a motor 100, and having cutter blades which shape the upper surface 36 of the jamb in accordance with FIG. 1H.

It should be noted that the shaper machine of FIGS. 2 and 3 has been simplified for purposes of clarity and that feed roller 40 is only illustrative of a feeding mechanism for feeding the board past the cutter heads 44, 54, 66, 74, 82, 88 and 98 which rotate in a direction opposite to the movement of the board, as indicated by the rotation arrows associated with each cutter head.

In conclusion, it will be obvious to those having ordinary skill in the art that many changes may be made in the details of the above-described preferred embodiment of the present invention without departing from the spirit of the invention. For example, the longitudinal notches 34 can be cut after the step of FIG. 1H, following the separation of the stop member from the jamb member by wedge 94. Therefore, the scope of the present invention should only be determined by the following claims.

I claim:

1. A method of manufacturing wood articles in which the improvement comprises:

cutting a single wood member to shape the surface of a first article and the surface of a second article while said articles are joined together as different portions of the same wood member;

said cutting including a first cutting to form at least one substantially flat reference surface on said member, a second cutting to form a first groove on one side of said member spaced a predetermined distance from said reference surface, and a third cutting to form a second groove in said member which extends substantially perpendicular to the first groove and whose bottom terminates a second predetermined distance from said reference surface which is substantially equal to said first distance; and separating said first and second articles along a separation extending between said first and second grooves.

2. A method in accordance with claim 1 in which the second cutting also forms a second substantially flat reference surface on said member and the second groove is spaced a third predetermined distance from said second reference surface.

3. A method in accordance with claim 2 in which the wood member is an elongated member of substantially rectangular cross section and the first and second grooves are cut longitudinally along the length of said member, while sliding said member along the two reference surfaces, and the first and second articles are a door jamb and a door stop.

4. A method in accordance with claim 3 in which the door stop is completely shaped with a curved side before it is separated from said wood member.

5. A method in accordance with claim 4 in which the door jamb is further shaped after separation of the door stop.

6. A method in accordance with claim 3 in which the first groove and other reference surface portions of the door jamb and door stop are shaped simultaneously by the same cutter and the second groove is spaced from such other reference surface portions by a third predetermined distance.

7. A method in accordance with claim 1 in which said separating is achieved by sawing and moving the sawed portion of the stop away from the jamb by a wedge.

* * * * *